United States Patent Office 3,378,728
Patented Apr. 16, 1968

3,378,728
ELECTRICAL PROTECTIVE RELAY EMPLOYING PHASE ANGLE COMPARATORS
William Derek Humpage, Glossop, and Sudesh Parkash Sabberwal, Coventry, England, assignors to The English Electric Company Limited, London, England, a British company
Filed Apr. 26, 1965, Ser. No. 450,699
Claims priority, application Great Britain, Apr. 28, 1964, 17,651/64, 17,652/64
10 Claims. (Cl. 317—36)

ABSTRACT OF THE DISCLOSURE

This invention relates to an electrical protective relay whose operating characteristic, on a complex impedance plane, may be readily adjusted to closely coincide with all expected fault impedance values in a given electrical system to be protected. This versatility is derived chiefly from the use of an asymmetrical phase angle comparator which is sensitive not only to the phase angle between two input signals but also to the phase sequence of these signals, this comparator being operative to produce an output whenever its input signals occur within different predetermined phase angles lying on opposite sides of a predetermined electrical vector quantity.

---

This invention relates to electrical protective relays.

From one aspect, the present invention consists in a protective relay for an electrical system, comprising first and second comparators each of which is adapted to compare at least two input signals which are proportional to different vectorial quantities representative of electrical conditions in said system, the comparators being arranged to produce output signals in response to their input signals possessing certain relationships which are predetermined to be indicative of a fault in said system, and a control device for producing a signal for effecting a control or alarm function whenever any portions of said output signals are coincident in time with one another, at least one of said comparators being an asymmetrical phase comparator, as herein defined.

The other comparator may be either an amplitude comparator or a symmetrical phase angle comparator.

From another aspect, the present invention consists in a protective relay for an electrical system, comprising first, second and third comparators each of which is adapted to compare at least two input signals which are proportional to different vectorial quantities representative of electrical conditions in said system, the comparators being arranged to produce output signals in response to their input signals possessing certain relationships which are predetermined to be indicative of a fault in said system, and a control device for producing a signal for effecting a control or alarm function whenever any portions of said output signals from all the comparators are coincident in time with one another, at least one of said comparators being an asymmetrical phase comparator, as herein defined.

At least one of these comparators may be an amplitude comparator or a symmetrical phase angle comparator.

An "asymmetrical phase comparator" is defined as a phase angle comparator which is sensitive to the phase sequence of the input signals in addition to the phase angle between them, and is operative to produce an output signal whenever its input signals occur within different predetermined phase angles lying on opposite sides of a predetermined electrical vector quantity.

Figure 1:
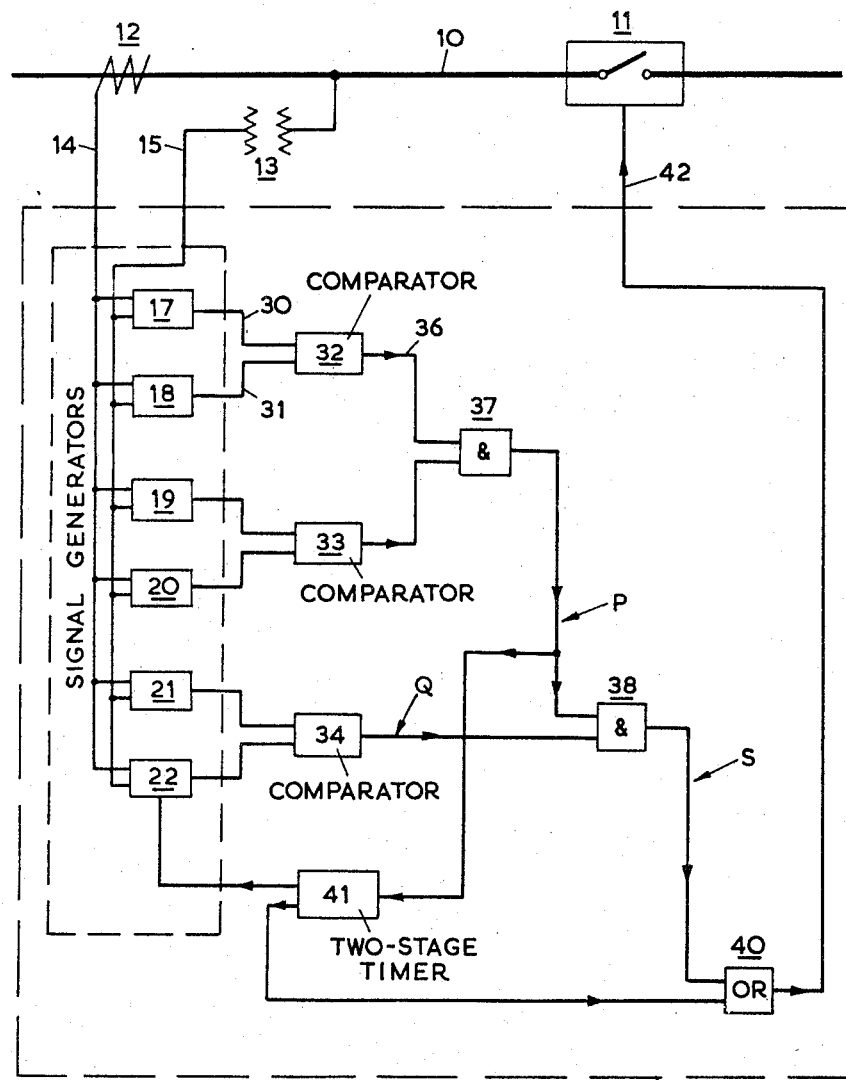
Figure 2:
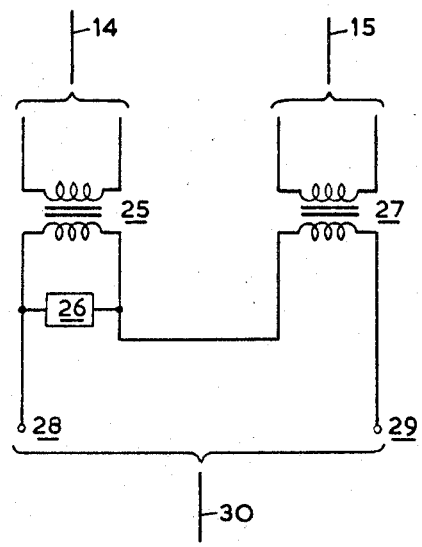
Figure 3:
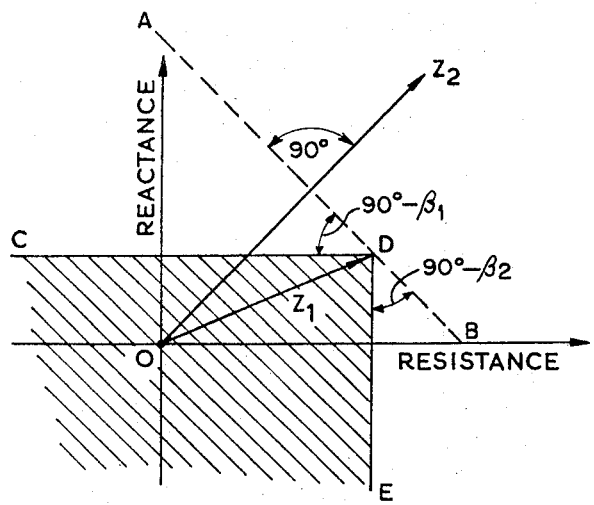
Figure 4:
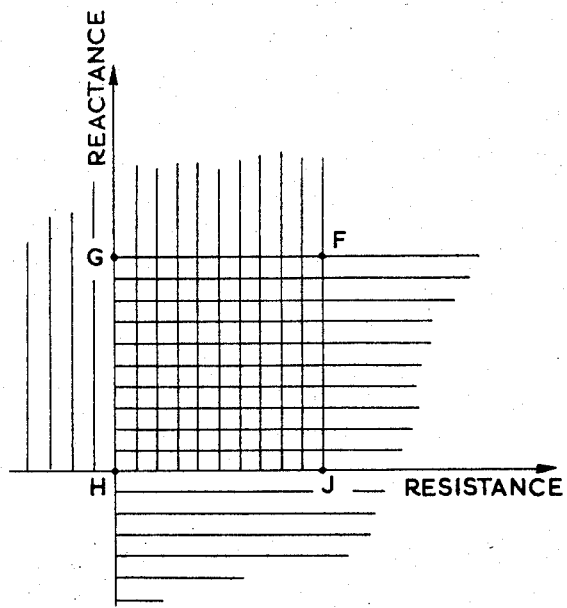
Figure 5:
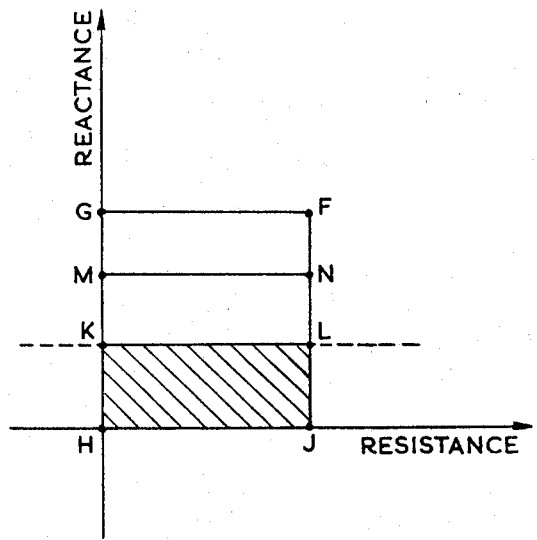
Figure 6:
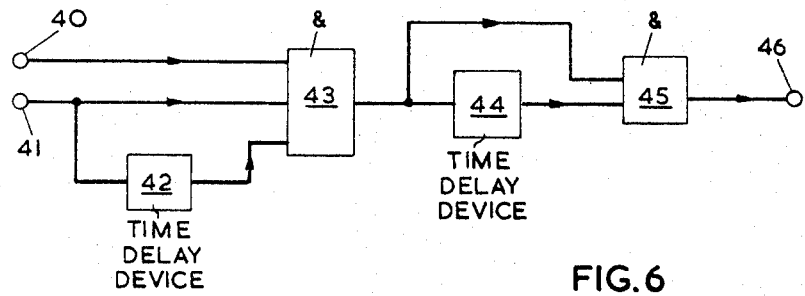
Figure 7:
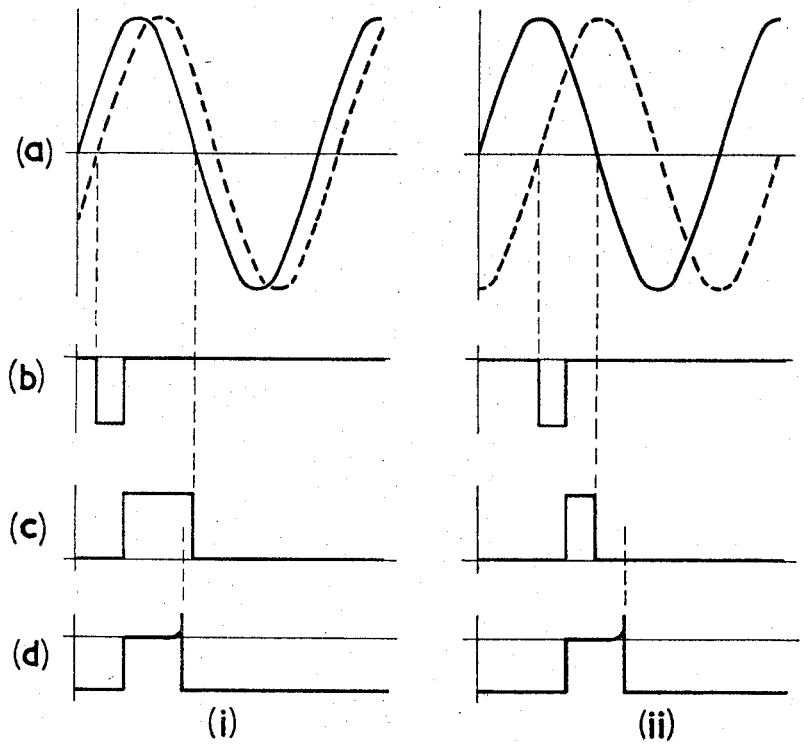
Figure 8:
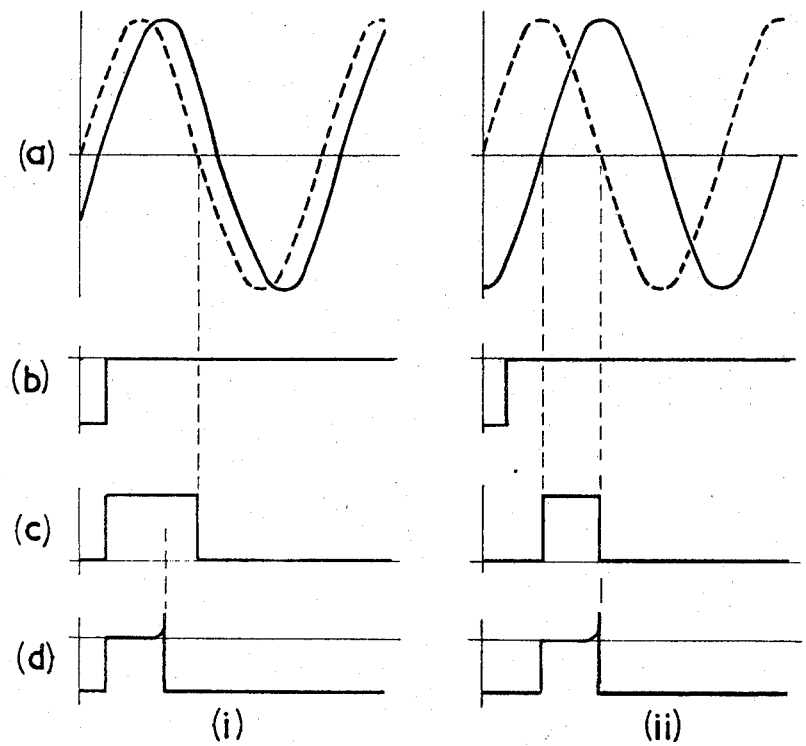
Figure 9:
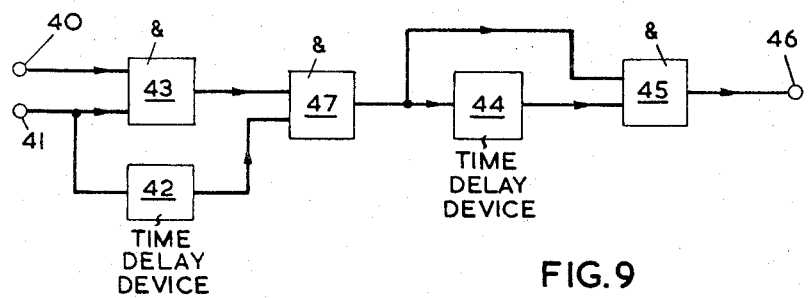
Figure 10:
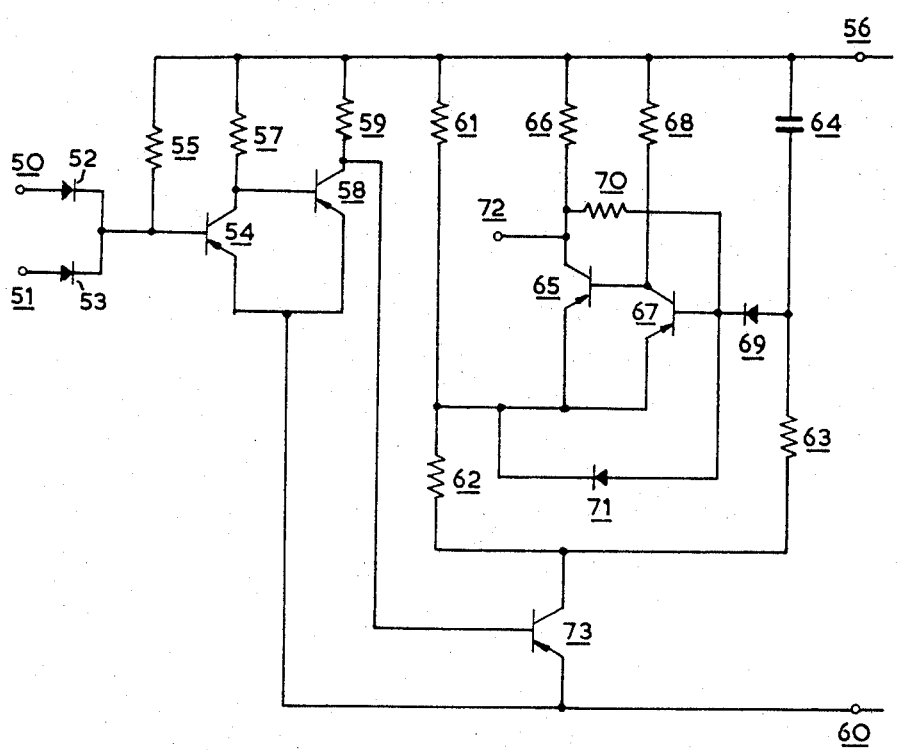

An electrical protective relay according to the present invention will now be described by way of example and with reference to the accompanying drawings in which:

FIG. 1 shows a schematic diagram of the relay in block diagram form;
FIG. 2 shows a circuit diagram of part of the relay;
FIG. 3 and FIG. 4 are impedance diagrams to aid in the explanation of the operation of the relay;
FIG. 5 is an impedance diagram showing operating characteristics of the relay;
FIG. 6 shows a schematic diagram of an asymmetrical phase angle comparator;
FIGS. 7 and 8 show waveforms obtained at various points in the circuit of FIG. 6;
FIG. 9 shows another form of asymmetrical phase angle comparators; and
FIG. 10 shows a circuit diagram of a symmetrical phase angle comparator.

Referring to FIG. 1, a power-line 10 to be protected by the relay may be disconnected from the supply in the event of an electrical fault by the operation of a circuit-breaker 11. A current transformer 12 and a voltage transformer 13 supply signals in relay input circuits 14 and 15 respectively proportional to the line current and line voltage. Inside the relay 16 the signals in the input circuits 14 and 15 are fed into a number of signal generators 17 to 20, which produce signals $S_1$ to $S_4$ respectively, and into signal generators 21 and 22. These signals $S_1$ to $S_4$ are as follows:

$$S_1 = -K_1 A_1 V + Z_1 I \underline{|\theta_1 - \phi}$$

$$S_2 = Z_2 I \underline{|\theta_2 - \phi}$$
$$S_3 = K_3 A_3 V - Z_3 I \underline{|\theta_3 - \phi}$$

$$S_4 = Z_4 I \underline{|\theta_4 - \phi}$$

where:

$K_1 A_1$ and $K_3 A_3$ are voltage coefficients;
$Z_1 \theta_1$, $Z_2 \theta_2$, $Z_3 \theta_3$ and $Z_4 \theta_4$ are transfer impedances;
V is the system voltage;
$I \underline{|-\phi}$ is the system current.

Phase-angle comparators 32 to 34 are arranged to receive and phase compare signals from their associated signal generators. Similarly, AND-gates 37 and 38 are arranged to produce tripping signals whenever they each receive two signals simultaneously.

An OR-gate 40 in response to a tripping signal from the AND-gate 38 or from a two-stage timer 41 initiates the tripping of the circuit-breaker 11 through an output circuit 42.

The circuit diagram of block 17 is shown in FIG. 2.

A current transformer 25 feeding an impedance 26 and a voltage transformer 27 have their secondary windings connected in series across terminals 28 and 29. The transformers 25 and 27 have their primary windings connected to input circuits 14 and 15 respectively so that an output signal developed at a line 30 is proportional to a voltage vector $(IZ_1 - V)$ where V and I are the voltage and the current in the power line 10 and $Z_1$ is the value of the impedance 26: that is, the voltage signal on the line 30 is of the form $(AV - BIZ_1)$.

The circuits of signal generators 18 to 22 are generally similar to the circuit of the signal generator 17. However, it will be appreciated that $Z_1$ may have any predetermined value and reversing the polarity of the secondary winding of either of the transformers 25 or 27 will reverse the polarity of I or V in the voltage vector $(AV - BIZ_1)$. Similarly, the transformers may be arranged to adjust the phase-angle of V relative to I or the magnitude of V relative to I as desired. Further, either of the transformers 25 or 27 may be removed so that a voltage signal on the line 30 may then be proportional to the voltage vector (AV) or (BIZ$_1$); that is, A and B may have any value and such values may be vector values (excepting that A and B cannot be zero simultaneously). It will be appreciated that Z$_1$ cannot be zero for the purpose of successful operation of the relay when A is simultaneously zero.

A mode of operation of the phase-angle comparator 32 will now be described with reference to FIG. 3. If the output signals of signal generators 17 and 18 are arranged in a manner described above to be dependent respectively on voltage vectors $(-V+IZ_1)$ and $(IZ_2)$ and Z$_L$ is the effective impedance of the power line, then $-V=IZ_L$ and the output signals of the signal generators may be described as effectively proportional to impedance vectors $(-Z_L+Z_1)$ and $(Z_2)$ respectively. In this case, the comparator will yield straight line characteristics. Now the phase-angle comparator 32 is arranged to receive and phase-compare the voltage signals on lines 30 and 31, and produce an output signal on a line 36 whenever the phase-angle between these signals falls within predetermined limits. These angular limits of phase comparison (coincidence angles) are specified at $\beta_1$ and $\beta_2$ corresponding respectively to the order or phase sequence in which the two input signals appear. Where $\beta_1=\beta_2$ the comparator is classed as a symmetrical comparator, but where $\beta_1\neq\beta_2$ the comparator is classed as an asymmetrical comparator and is sensitive to the phase sequence of the input signals as well as the phase angle between them.

A vectorial illustration of the response of this two-input comparator is given in FIGURE 3 which shows the polar characteristics defined under symmetrical operation, $\beta_1=\beta_2=45°$ in this instance, the comparator being arranged to produce an output whenever the effective impedance (Z$_L$) of the power line lies within the hatched characteristic. In constructing this characteristic the vector impedance Z$_1$ is initially entered to locate point D, and the phase angle of impedance Z$_2$ determines the position of the line A–B. In turn, the angle included by AB and CD is dependent on the coincidence angle $\beta_1$ and the angle included by AB and ED is dependent on the coincidence angle $\beta_2$. As mentioned above, $\beta_1=\beta_2$ in this instance but with an asymmetrical comparator $\beta_1\neq\beta_2$, thus lines CD and/or DE may be independently "rotated" about the point D.

In FIG. 4, a polar characteristic FGHJ demonstrates a zone protection of the relay. The phase comparator 32 is arranged to produce an output signal for the AND-gate 37 whenever the effective impedance of the power line lies within the area of horizontal hatching. In a similar manner, the phase comparator 33 is arranged to produce an output signal for the AND-gate 37 whenever the effective impedance of the power line lies within the area of vertical hatching. A tripping signal is produced by the AND-gate 37 whenever the said output signals from comparators 30 and 33 are present simultaneously; that is, whenever the effective line impedance falls within the area FGHJ of both horizontal and vertical hatching.

The operation of the relay circuit will now be described with reference to FIG. 1 and FIG. 5. The signals developed by the signal generator 17 to 20 are respectively signals, as described above, S$_1$ to S$_4$. Whenever the effective impedance of the power line falls within the area bounded by the polar characteristic FGHJ in FIG. 5 an output signal will be present at P in FIG. 1. Whenever the effective impedance of the power line has a reactance value which is positive and equal to or less than HK, as defined by signals from signal generators 21 and 22 an output signal will be present at Q. Thus a tripping signal will be produced without delay at S whenever the effective impedance of the power line is within the polar characteristic LKHJ enabling a zone ONE protection.

The presence of a signal at P causes the two-stage timer 41 to modify the parameters of the signal generator 22, after a predetermined time delay, so that an output signal will then be produced whenever the effective impedance of the power line lies within the polar characteristic NMHJ enabling a zone TWO protection.

After a further time delay, the two-stage timer 41 produces a tripping signal for the OR-gate 40 for enabling zone THREE protection.

It will be appreciated that any operating characteristic may be logically built up from two or more signals compared in one or more comparators and subsequently AND-compounded or OR-compounded using AND-gates, OR-gates, or any other suitable means. Further each characteristic may be independently controlled and altered so that, for example, the reactive reach of the operating characteristic in FIG. 5 may be extended independently of the resistive reach of the operating characteristic. Similarly, although FIGS. 4 and 5 have been drawn with rectangular coordinates any of the horizontal, or the vertical construction lines may be "tilted" as in the case described with reference to FIGURE 3, about the points F, N or L in such a way that they are displaced from their indicated positions. Further, the relay is in no way limited to providing straight-line operating characteristics since circular characteristics, such as mho-type relay operating characteristics for example, may equally well be compounded in a similar manner as described above.

In addition, a number of straight-line and circular characteristics may be logically compounded together to provide any desired complex relay operating characteristics. Furthermore, by modification of the signal generators and the comparator, each of the characteristics may be individually controlled before combination.

The relay has an advantage over other relays in that its polar characteristics may be easily arranged to closely coincide with a locus of all expected fault impedance values in a given electrical system. In this way the relay is less susceptible to mal-operation, due to power swings in the system for example. The relay may be simply adjusted to provide any desired polar characteristics as demonstrated above.

In FIG. 6, an asymmetrical phase angle comparator is shown having two input terminals 40 and 41 for receiving two input signals from the signal generators, and includes a signal time-delaying device 42 for receiving one of the input signals and for producing in response thereto a time-delayed output signal. An AND-gate 43 is arranged to receive the input signals and the time-delayed output signals and produce an intermediate signal whenever these signals simultaneously have the same predetermined sense. A further signal time-delaying device 44 is connected to the AND-gate 43 for producing in response to the intermediate signal a time-delayed auxiliary signal and, in turn, and AND-gate 45 is connected to the AND-gate 43 and the device 44 so as to produce the comparator output signal at a terminal 46 whenever this latter signal and the intermediate signal simultaneously have the same predetermined sense.

In use, the signal time-delaying device 42 has the effect of reducing the effective "angle of coincidence" of the input signals when they change their sense in a first order or sequence and is at the same time ineffective to change the effective "angle of coincidence" if the input signals change to the same sense in the reverse order to the first order. Thus, this comparator provides detection of unequal phase angles on either side of a predetermined vector quantity as represented on an impedance diagram.

The signal time-delaying device 44 delays the intermediate signal by a predetermined time period and is therefore effective together with the AND-gate 45 to "test the width" of the intermediate signal, the time delay introduced by the signal time-delaying device 44 thereby governing the actual phase angles detected by the phase angle comparator.

The operation of the asymmetrical comparator is described below in more detail with reference to the waveforms shown in FIGS. 7a to d and 8a to d in which asymmetry is introduced into the limits of phase comparison with respect to the in-phase condition of the two input signals applied to terminals 40, 41.

In FIG. 7a column (i) is shown the signal applied to terminal 40 leading that applied to terminal 41 by a phase angle lying inside the limit of tripping for that sequence and column (ii) shows the case for which the former signal leads by a phase angle lying outside this limit. FIGURE 7b shows the time delay introduced by the device 42 to the signal on terminal 41 so as to inhibit the output from the AND-gate 43 (shown in FIGURE 7c for the duration of this delay. The time delayed auxiliary signal or "test width" pulse produced by the device 44 is shown in FIGURE 7d. Since in column (i) the duration of the output (intermediate) signal from the gate 43 (constituting one input to the gate 45) exceeds the duration of this "test width" pulse (constituting the other input to gate 45) a trip output is produced at terminal 46 upon coincidence between the trailing edge of this pulse and the output signal, but in column (ii) the duration of the output from gate 43 is less than this "test width" pulse and accordingly no tripping output is produced.

Thus, as mentioned above, the time delay device 42 has the effect of reducing the effective "angle of coincidence" of the input signals so that only such coincidence angles as exceed a predetermined limiting value give rise to an output signal.

In particular, if $\beta$ is the coincidence angle in the absence of the inhibiting signal from the device 42 then the effective coincidence angle, say $\beta_1$ (cf. FIGURE 3), is given by $\beta_1 = \beta - t360f$, where $t$ is the period of the delay introduced by the device 42 and $f$ is the signal frequency.

This mode of operation however, is effective only when the sequence of the input signals is as shown in FIGURE 7a. When the signals are in the reverse sequence, the time-delay device 42 is ineffective in determining the limit of phase comparison as can be seen from FIGURES 8a to 8d which illustrate the waveforms corresponding to the same positions in the circuit as those shown in FIGURES 7a to 7d; column (ii) in these figures shows the threshold level of tripping as determined by the "test width" pulse from the device 44. In this case the coincidence angle, say $\beta_2$ is given by $\beta_2 = \alpha$, where $\alpha$ is the phase angle between the two input signals.

FIG. 9 shows an asymmetrical phase angle comparator having an alternative input circuit consisting of a further AND-gate 47 connected to receive the intermediate signal produced by AND-gate 43 whenever its input signals have a same predetermined sense. The signal time delaying device 42 is arranged to receive an input signal as before but supplies the second auxiliary signal to the AND-gate 47 instead of the AND-gate 43. The operation of this comparator is similar to that described above.

It will be appreciated that other signal time delaying devices may be introduced to add other time-delayed input signals dependent on the other input signal for controlling the angles of measurement at both sides of the said predetermined vector quantity independently. It will be further appreciated that the time delaying devices in this comparator may be adjustable devices so that the angles of measurement are readily adjustable.

In FIG. 10 a symmetrical phase angle comparator has input terminals 50 and 51 for receiving the signals $S_1$ and $S_2$ respectively. Diodes 52 and 53 are connected to the terminals 50 and 51 respectively for feeding the signals $S_1$ and $S_2$ to the base of a PNP transistor 54. A resistor 55 is connected between the base of the transistor 54 and a supply terminal 56. A resistor 57 is connected between the supply terminal 56 and the collector of the transistor 54. A PNP transistor 58 has its base connected to the collector of the transistor 54 and its collector connected through a resistor 59 to the supply terminal 56. The emitter of the transistor 54 and 58 are connected in parallel to a supply terminal 60.

A series loop comprising resistors 61, 62, 63 and a capacitor 64 has both ends of the loop connected to the supply terminal 56. The collector of a PNP transistor 65 is connected through a resistor 66 to the supply terminal 56 and the collector of a PNP transistor 67 is connected through a resistor 68 to the supply terminal 56, the emitters of the transistors 65 and 67 are connected in parallel to the junction between the resistors 61 and 62, the base of the transistor 65 being connected to the collector of the transistor 67. The base of the transistor 67 has a first connection through a diode 69 to the junction between the resistor 63 and the capacitor 64, a second connection through a resistor 70 to the collector of the transistor 65 and a third connection through a diode 71 to the emitter of the transistor 65. An output terminal 72 is connected to the collector of the transistor 65.

A PNP transistor 73 has its base connected to the collector of the transistor 58, its emitter connected to the supply terminal 60 and its collector connected to the junction between the resistors 62 and 63.

In operation the supply terminals 56 and 60 are connected to an external direct current supply so that they have respectively a negative potential and an "earth" potential. The diodes 52 and 53 and the transistors 54 and 58 form an AND-gate for detecting the time period for which the signals $S_1$ and $S_2$ are simultaneously negative. An intermediate signal produced at the collector of the transistor 58 having a waveform of width proportional to the phase angle between the signals $S_1$ and $S_2$. The intermediate signal is supplied to the base of the transistor 73 to render this transistor conductive during the negative-going part of the intermediate signal.

Whenever the transistor 73 is rendered conductive a charging current flows through this transistor to charge the capacitor 64. At a predetermined charge the voltage at the junction between the resistor 63 and the capacitor has a value sufficient to render the transistor 67 conductive and hence in turn the transistor 65 is also rendered conductive so that current flows in the resistor 66 and the potential at the output terminal 72 becomes more positive which represents the comparator output signal.

When the transistor 73 is not conductive the capacitor 64 discharges through a discharge path consisting of the resistor 61 and the diode 71.

If the negative-going width of the intermediate signal is less than a predetermined time period then the charging of the capacitor 64 ceases before the charge thereof has reached the said predetermined charge so that the transistor 67 remains non-conductive and the voltage at the output terminal 72 remains at or near the voltage applied at the supply terminal 56; that is, no output signal is produced.

Thus, this phase angle comparator produces an output signal only when the phase angle between the signals $S_1$ and $S_2$ is greater than a predetermined phase angle. The value of this predetermined phase angle may be adjusted by adjusting the capacitance of the capacitor 64 or by altering the base voltage required to render the transistor 67 conductive.

What we claim as our invention and desired to secure by Letters Patent is:

1. An electrical protective relay comprising first, second and third comparators each for receiving and comparing two input signals, each input signal being proportional to a different vectorial quantity dependent on the electrical conditions in an electrical system to be protected by the relay, the comparators being arranged to produce first, second or third output signals respectively in response to a predetermined relationship of their input signals indicative that an electrical fault has occurred in first, second or third areas respectively as represented on an impedance diagram wherein the relay includes for each comparator a pair of signal generators respectively supplied with a voltage and a current signal proportional to the electrical conditions in the power system to be protected and for producing in response thereto the said input signals, a first AND-gate for receiving the said first and second output signals and producing a first control signal whenever the first and second output signals are present simultaneously and a second AND-gate for receiving the third output signal and the first control signal and producing a second control signal whenever the first control signal and third output signal are present simultaneously, a two-stage time delaying device for receiving the first control signal and for producing in response thereto after a first time delay a third control signal for modifying one of the signal generators supplying the third comparator so as in turn to modify effectively the said third area as represented on an impedance diagram and the time delaying device producing after a further time delay a fourth control signal, and an OR-gate for receiving the said second and said fourth control signals and for producing whenever either the said second or the said fourth control signals are present an initiating signal for initiating the tripping of a circuit breaker in the electrical system to be protected.

2. A relay according to claim 6 wherein said timing device is operative in response to portions of the output signals from the first and second comparators being coincident in time directly to actuate said control device by a control signal after a time interval longer than said predetermined period.

3. A relay according to claim 1, wherein said control device comprises
   a first AND-gate for producing a first signal in response to the output signals from the first and second comparators being coincident in time,
   a second AND-gate for producing a second signal in response to the first signal and the output from the third comparator being coincident in time and
   an OR-gate for producing the control signal in response to either the said second signal or the control signal from the timing device.

4. A relay according to claim 3, wherein said asymmetrical phase angle comparator comprises
   comparison means for initially comparing its input signals and developing therefrom an intermediate signal,
   a time delay device for developing an auxiliary signal by delaying said intermediate signal for a predetermined period, and
   and AND-gate for receiving the intermediate and auxiliary signals and operative to produce an output signal whenever any portions of said signals are coincident in time with one another.

5. A relay according to claim 4, wherein said comparison means comprises
   a further time delay device for developing a further auxiliary signal by delaying one of the input signals to the comparator by a predetermined period, and
   an AND-circuit operative to develop said intermediate signal whenever any portions of all the input signals applied to said comparator and the said further auxiliary signal are coincident in time with one another.

6. A protective relay for an electrical system, comprising
   first and second comparators each of which is adapted to compare at least two input signals which are proportional to different vectorial quantities representative of electrical conditions in said system, the comparators being arranged to produce output signals in response to their input signals possessing certain relationships which are predetermined to be indicative of a fault in said system, and
   a control device for producting a signal for effecting a control function whenever any portions of said output signals are coincident in time with one another, at least one of said comparators being
   an asymmetrical phase angle comparator comprising comparison means for initially comparing its input signals and developing therefrom an intermediate signal,
   a time delay device for developing an auxiliary signal by delaying said intermediate signal for a predetermined period, and
   an AND-gate for receiving the intermediate and auxiliary signals and operative to produce an output signal whenever any portions of said signals are coincident in time with one another.

7. A relay according to claim 6, wherein said comparison means comprises
   a further time delay device for developing a further auxiliary signal by delaying one of the input signals to the comparator by a predetermined period, and
   an AND-circuit operative to develop said intermediate signal whenever any portions of all the input signals applied to said comparator and the said further auxiliary signal are coincident in time with one another.

8. A protective relay for an electrical system, comprising
   first and second comparators each of which is adapted to compare at least two input signals which are proportional to different vectorial quantities representative of electrical conditions in said system, the comparators being arranged to produce output signals in response to their input signals possessing certain relationships which are predetermined to be indicative of a fault in said system, and
   a control device for producting a signal for effecting a control function whenever any portions of said output signals are coincident in time with one another, one of the comparators being
   an asymmetrical phase angle comparator which is sensitive to the phase sequence of its input signals in addition to the phase angle between them and is operative to produce a said output signal whenever the input signals occur within different predetermined phase angles lying on opposite sides of a predetermined vector quantity, and the other comparator being
   an amplitude comparator for comparing the amplitudes of its input signals and for producing a said output signal upon a predetermined amplitudinal relationship existing between them.

9. A protective relay for an electrical system, comprising
   first and second comparators each of which is adapted to compare at least two input signals which are proportional to different vectorial quantities representative of electrical conditions in said system, the comparators being arranged to produce output signals in response to their input signals possessing certain relationships which are predetermined to be indicative of a fault in said system, and
   a control device for producing a signal for effecting a control function whenever any portions of said output signals are coincident in time with one another, one of the comparators being
   an asymmetrical phase angle comparator which is sensitive to the phase sequence of its input signals in addition to the phase angle between them and is operative to produce a said output signal whenever the input signals occur within different predetermined phase angles lying on opposite sides of the predtermined vector quantity, and the other comparator being
   a symmetrical phase angle comparator for producing an output signal whenever its input signals occur within predetermined phase angles lying on opposite sides of a predetermined electrical vector quantity, the said phase angles having the same value as one another.

10. A protective relay for an electrical system, comprising first, second and third comparators each of which is adapted to compare at least two alternating input signals which are proportional to different vectorial quantities representative of electrical conditions in said system, the comparators being arranged to produce unidirectional output signals in response to their input signals possessing certain relationships which are predetermined to be indicative of a fault in said system, a control device for producing a signal for effecting a control function whenever any portions of said output signals from all the comparators are coincident in time with one another, at least one of said comparators being an asymmetrical phase angle comparator which is sensitive to the phase sequence of its input signals in addition to the phase angle between them and is operative to produce a said output signal whenever the input signals occur within different predetermined phase angles lying on opposite sides of a predetermined vector quantity and a timing device for modifying one of the said input signals to the third comparator after a predetermined period whenever portions of the output signals from the first and second comparators are coincident in time.

References Cited

UNITED STATES PATENTS

| | | | |
|---|---|---|---|
| 3,048,744 | 8/1962 | Warrington | 317—36 |
| 3,163,802 | 12/1964 | Sequin et al. | 317—36 |
| 3,192,442 | 6/1965 | Warrington et al. | 317—47 |
| 3,209,204 | 9/1965 | Rockfeller | 317—47 |
| 3,312,864 | 4/1967 | Schwanerflugel | 317—47 |

MILTON O. HIRSHFIELD, *Primary Examiner.*

R. V. LUPO, *Assistant Examiner.*